(12) United States Patent
Pfleger et al.

(10) Patent No.: US 11,761,532 B2
(45) Date of Patent: Sep. 19, 2023

(54) HYDRAULIC CONTROL UNIT FOR A TRANSMISSION

(71) Applicant: ZF Friedrichshafen AG, Friedrichshafen (DE)

(72) Inventors: Tobias Pfleger, Markdorf (DE); Hans-Joachim Martin, Kressbronn (DE); Marco Berner, Eriskirch (DE); Jens Schmidt, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 317 days.

(21) Appl. No.: 16/814,486

(22) Filed: Mar. 10, 2020

(65) Prior Publication Data

US 2020/0292065 A1   Sep. 17, 2020

(30) Foreign Application Priority Data

Mar. 11, 2019 (DE) ...................... 10 2019 203 238.9

(51) Int. Cl.
*F16H 61/00* (2006.01)
*F16K 27/00* (2006.01)

(52) U.S. Cl.
CPC ....... *F16H 61/0009* (2013.01); *F16K 27/003* (2013.01)

(58) Field of Classification Search
CPC ............. F16H 61/0009; F16H 61/0206; Y10T 137/87877; F16K 27/003
See application file for complete search history.

(56) References Cited

U.S. PATENT DOCUMENTS

| 1,212,791 | A |   | 1/1917  | Manly   |              |
|-----------|---|---|---------|---------|--------------|
| 3,679,218 | A | * | 7/1972  | Farnam  | F16J 15/122  |
|           |   |   |         |         | 277/654      |
| 5,575,190 | A | * | 11/1996 | Hirose  | F15B 13/0807 |
|           |   |   |         |         | 74/606 R     |
| 6,073,938 | A | * | 6/2000  | Abe     | F16J 15/104  |
|           |   |   |         |         | 277/644      |
| 6,076,556 | A | * | 6/2000  | Fuchs   | F15B 13/081  |
|           |   |   |         |         | 137/884      |
| 6,827,106 | B2| * | 12/2004 | Hori    | F15B 21/041  |
|           |   |   |         |         | 137/884      |
| 7,073,407 | B2| * | 7/2006  | Stefina | F16H 59/70   |
|           |   |   |         |         | 74/331       |

(Continued)

FOREIGN PATENT DOCUMENTS

| CN |  108825772 A  | * | 11/2018 |
|----|---------------|---|---------|
| DE | 102008008236 A1 |  | 8/2009  |

(Continued)

OTHER PUBLICATIONS

German Search Report DE102019203238.9, dated Oct. 31, 2019, (12 pages).

*Primary Examiner* — Michael R Reid
(74) *Attorney, Agent, or Firm* — Dority & Manning, P.A.

(57) ABSTRACT

A hydraulic control unit (10) for a transmission (36) of a motor vehicle drive train may include a housing top section (12), a first valve housing (14) having a first valve (60), and a second valve housing (16) having a second valve (62). The first valve (60) is aligned along a first direction (30) and the second valve (62) is aligned along a second direction (32), wherein the first direction (30) differs from the second direction (32).

18 Claims, 5 Drawing Sheets

(56) References Cited

U.S. PATENT DOCUMENTS

| | | | |
|---|---|---|---|
| 8,033,298 B2 * | 10/2011 | Matsufuji | F15B 13/0814 |
| | | | 137/899 |
| 8,210,975 B2 * | 7/2012 | Mizobe | F16H 61/0009 |
| | | | 475/61 |
| 8,733,210 B2 * | 5/2014 | Sueshige | F16H 61/006 |
| | | | 74/730.1 |
| 8,915,812 B2 | 12/2014 | Haeglsperger et al. | |
| 9,108,499 B2 * | 8/2015 | Long | F16H 61/0031 |
| 2006/0030453 A1 * | 2/2006 | Yokoyama | F16H 61/0009 |
| | | | 477/37 |
| 2009/0088281 A1 * | 4/2009 | Mizobe | F16H 61/0009 |
| | | | 475/123 |
| 2011/0168930 A1 | 7/2011 | Tomoda et al. | |
| 2017/0130823 A1 * | 5/2017 | Schoellhammer | F16H 61/0009 |
| 2018/0180070 A1 * | 6/2018 | Uesugi | F15B 13/0871 |
| 2019/0003577 A1 | 1/2019 | Kidokoro et al. | |
| 2019/0101140 A1 | 4/2019 | Matsuyama et al. | |

FOREIGN PATENT DOCUMENTS

| | | | | |
|---|---|---|---|---|
| DE | 112017000583 T5 | 12/2018 | | |
| EP | 3372870 A1 | 9/2018 | | |
| WO | WO-2010072402 A1 * | 7/2010 | | F16H 61/0009 |

* cited by examiner

HYDRAULIC CONTROL UNIT FOR A TRANSMISSION

CROSS-REFERENCE TO RELATED APPLICATION

The present application is related and has right of priority to German Patent Application No. 10 2019 203 238.9 filed on Mar. 11, 2019, the entirety of which is incorporated by reference for all purposes.

FIELD OF THE INVENTION

The present invention relates generally to a hydraulic control unit for a transmission of a motor vehicle drive train, a transmission having such a hydraulic control unit, and a method for manufacturing such a hydraulic control unit.

BACKGROUND

Document EP 3 372 870 A1 discloses a hydraulic control unit for a transmission device for a vehicle. The hydraulic control unit has a first oil duct, which is formed by connecting two body sections.

An object of the present invention is to provide a hydraulic control unit, a transmission, and a method for manufacturing a hydraulic control unit, which are advantageous in terms of functionality and subdivision of the installation space.

SUMMARY OF THE INVENTION

According to one aspect of the invention, this object is achieved by a hydraulic control unit for a transmission of a motor vehicle drive train. The hydraulic control unit is configured for supplying at least one transmission component with a hydraulic fluid. For example, the hydraulic control unit is configured for allowing for a hydraulically actuatable actuating element and/or a hydraulic lubrication and/or a hydraulic cooling, for example, an oil cooling. The hydraulic control unit is controls, by an open-loop or closed-loop system, a pressure of a hydraulic fluid and/or an application of a hydraulic fluid.

The transmission is a transmission for a vehicle, in particular for a motor vehicle. The transmission is, for example, an automatic transmission.

The hydraulic control unit has a housing top section, a first valve housing, and a second valve housing. The housing top section is a one-piece component, for example, a one-piece casting. The housing top section is connectable to a part of a transmission, for example, to establish a mechanical connection, a hydraulic connection, and/or an electrical connection. For example, the housing top section is connectable to a transmission housing, for example, in order to establish a hydraulic connection and/or a mechanical connection and/or an electrical connection. The housing top section has an interface to a transmission housing, a clutch, and/or a gear set. The housing top section is configured for protecting and/or fixing hydraulic elements, for example, valves and/or ducts, located in the housing top section.

The first valve housing is a one-piece component, for example, a one-piece casting. The first valve housing accommodates one or more valve(s) and/or one or more hydraulic duct(s). The first valve housing protects and/or fixes hydraulic elements, for example, valves and/or ducts, located therein.

The second valve housing is a one-piece component, for example, a one-piece casting. The second valve housing accommodates one or multiple valve(s) and/or one or multiple hydraulic duct(s). The second valve housing protects and/or fixes hydraulic elements, for example, valves and/or ducts, located therein.

A one-piece embodiment of the first valve housing, the second valve housing, and/or the housing top section is advantageous, for example, with regard to the manufacture and/or the assembly of the hydraulic control unit.

The housing top section, the first valve housing, and/or the second valve housing, overall, form(s) a housing for hydraulic elements, such as valve(s), duct(s), restrictor(s), filter(s), and/or pump(s). The housing top section, the first valve housing, and/or the second valve housing form(s), in particular, a modularly designed housing for hydraulic elements. As a result, a method for manufacturing a hydraulic control unit and an exchange of replacement parts become more efficient. The housing top section, the first valve housing, and/or the second valve housing are designed and arranged with respect to one another such that the housing top section, the first valve housing, and/or the second valve housing are fluidically connected to one another. For example, the first valve housing has a fluid inlet. The housing top section has a fluid outlet. The housing top section, the first valve housing, and/or the second valve housing are connected to one another such that a fluid exchange takes place between the housing top section, the first valve housing, and/or the second valve housing without losses or contamination from the outside. The first valve housing, the second valve housing, and/or the housing top section are implementable, for example, with three pressure dies.

An embodiment of the hydraulic control unit having a housing top section, a first valve housing, and a second valve housing results, for example, in a modular embodiment. As a result, a method for manufacturing the hydraulic control unit is simplified and/or an exchange of replacement parts is simplified.

The first valve housing has a first valve. The first valve controls, by a closed-loop system, a pressure of the hydraulic fluid. The first valve is selected, for example, from a group of valves consisting of a pressure regulator, a solenoid valve, a directional valve, a through valve, a throttle valve, a change-over valve, a two-pressure valve, a check valve, or an electrical valve. The first valve is arranged, for example, completely within the first valve housing. Alternatively, a part of the first valve, for example, one or more of an electrical connection, a regulator knob and a spring is arranged outside the first valve housing.

The second valve housing has a second valve. The second valve is selected, for example, from the aforementioned group of valves. The second valve controls, by an open-loop or closed-loop system, a pressure and/or a flow of the hydraulic fluid. The second valve, for example, is completely within the second valve housing. Alternatively, a part of the second valve is outside the second valve housing, for example, one or more of an electrical connection, a regulator knob, and a spring.

For example, the first valve housing has a first cavity for accommodating the first valve. The first cavity is adaptable, for example, to the shape of the first valve, for example, with the aid of an appropriate trough. For example, the second valve housing has a second cavity for accommodating the second valve. The second cavity is adaptable, for example, to the shape of the second valve, for example, with the aid of an appropriate trough. At least one of the first valve housing or the second valve housing is configured, in particular, for accommodating one or multiple electromagnetic actuating element(s) and/or one or multiple hydraulic trailer slide(s).

At least one of the first valve housing or the second valve housing has, for example, valve slides, for example, one or more of a pressure reduction valve(s), a pressure relief valve(s), and a hydraulic switch(es). Actuating forces on the valve slides are applied, for example, hydraulically, electromagnetically, and/or mechanically. For example, a regulator (s) is arranged at and/or in the first valve housing and/or the second valve housing, for example, in order to supply appropriate actuators of a transmission with hydraulic fluid. The first valve housing and/or the second valve housing has one or multiple recess(es), in particular for one or multiple first valve(s) and/or one or multiple second valve(s).

At least one of the first valve housing or the second valve housing has at least one filter for filtering hydraulic fluid, in particular scavenged hydraulic fluid, for example, in order to protect the at least one of the first valve or the second valve. For example, one or multiple, for example, two pressure regulator(s) are arranged on the second valve housing. The pressure regulators are fixable on the second valve housing, for example, with one, or preferably two, mounting plates.

The first valve is aligned along a first direction. For example, the first direction is a machining direction. The machining direction is, for example, a direction of a bore hole in the first valve housing. For example, the first direction corresponds to the alignment of an axis, for example, a longitudinal axis, of the first valve. For example, the first direction corresponds to an alignment of a spring of the first valve. For example, the first direction is an actuation direction of the first valve, for example, of a piston or of a slide of the first valve.

The second valve is aligned along a second direction. For example, the second direction is a machining direction. The machining direction is, for example, a direction of a bore hole in the second valve housing. The first direction is, for example, a drilling direction for the first valve. The second direction is, for example, a drilling direction for the second valve. For example, the second direction corresponds to the alignment of an axis, for example, a longitudinal axis, of the second valve. For example, the second direction corresponds to an alignment of a spring of the second valve. For example, the second direction is an actuation direction of the second valve, for example, of a piston or of a slide of the second valve. The first direction and the second direction are vectors, for example, in the direction of a compression of a spring.

The first direction is not identical to the second direction. For example, the first direction has an angle not equal to 0° with respect to the second direction. For example, the first direction is antiparallel to the second direction. For example, the first valve is aligned in opposition to the second valve. Alternatively, the first valve has a right angle with respect to the second valve. For example, the first direction has a first angle with respect to the second direction of 5° to 355°, in particular of 80° to 100°, in particular of 88° to 92°. For example, an angle between the first direction and the second direction is 90°.

For example, the first valve housing has multiple first valves. For example, the second valve housing has multiple second valves. For example, the first valve housing additionally has at least one second valve. For example, the second valve housing additionally has at least one first valve. For example, the first valve housing has multiple first valves, which are aligned in the first direction. For example, the second valve housing has multiple second valves, which are aligned in the second direction. For example, the first valve housing has at least one valve, which is aligned in the second direction or in a third direction. For example, the second valve housing has at least one valve, which is aligned in the first direction, the third direction, or in a fourth direction. The third direction and/or the fourth direction is nonidentical to the first direction and/or the second direction. For example, the second valve housing has two second valves, which are aligned along the second direction. For example, the second valve housing has a valve, which is aligned in opposition to the two second valves. For example, the first valve housing has six first valves, which are aligned at a right angle, in particular at an angle between 85° and 95°, with respect to the second valve. For example, the first valve housing has at least one valve, which is aligned in parallel or antiparallel to the second valve. For example, multiple valves, in particular multiple first valves, are arranged in a second plane in the first valve housing. For example, multiple valves, in particular multiple second valves, are arranged in a third plane in the second valve housing. The second plane is parallel to the third plane.

For example, the hydraulic control unit includes a parking lock valve, a position valve, and a pressure regulator. The parking lock valve has a machining direction in opposition to the position valve and to the pressure regulator. The second valve housing has, for example, two bore holes for valves, in particular two opposing bore holes for valves. For example, each of one or two bore holes for valves in the second valve housing is perpendicular to a bore hole for a valve in the first valve housing.

A first angle not equal to 0° between the first valve and the second valve is advantageous with regard to installation space-related problems. Due to the first angle between the first valve and the second valve, an accessibility of the first valve and/or of the second valve, for example, during assembly, and/or with regard to an electrical connection, is improved. The first angle simplifies, for example, cable or wire routing. For example, due to the first angle, the hydraulic control unit is thinner. This is advantageous with regard to installation space-related problems. With the aid of the first angle, a distance between a center of gravity of the first valve housing and a center of gravity of the second valve housing is shortened, for example.

The distribution of valves between the first valve housing and the second valve housing results in a lower channel-routing complexity. As a result, a method for manufacturing a hydraulic control unit and/or a method for exchanging replacement parts is simplified. In addition, as a result, for example, an adaptation to different transmission types and/or requirements is simplified.

A first intermediate plate is arranged between the housing top section and the first valve housing. The first intermediate plate is, for example, an intermediate sheet. For example, the first intermediate plate is an intermediate sheet including screen printing. The first intermediate plate is arranged, for example, directly between the housing top section and the first valve housing, i.e., without a further element therebetween. Alternatively, a further element, for example, an element for sealing, is arranged next to the first intermediate plate, between the housing top section and the first valve housing. For example, the first intermediate plate is configured for sealing, in particular fluidically sealing, the housing top section with respect to the first valve housing. The first intermediate plate includes, for example, one or multiple opening(s), in order to establish a hydraulic connection between the housing top section and the first valve housing.

The first intermediate plate is thinner than 5 mm, in particular thinner than 2 mm, in particular thinner than 1.4 mm. For example, the first intermediate plate has a thickness of 1.3 mm. For example, the first intermediate plate has a thickness between 1.8 mm and 0.8 mm. As a result, the hydraulic control unit is space-saving.

The first intermediate plate is, for example, a stamped part. The first intermediate plate is, for example, manufactured without using a casting process. As a result, costs are reduced. The first intermediate plate does, for example, not have a valve. For example, the first intermediate plate does not have a pattern of ducts. As a result, a favorable installation space situation is achieved. For example, a seal is implemented between the first valve housing and the housing top section with the aid of the first intermediate plate, in particular using a small amount of material and at low cost.

A second intermediate plate, for example, is arranged between the first valve housing and the second valve housing. The second intermediate plate is designed, for example, similarly to the first intermediate plate. For example, the second intermediate plate has the same thickness as the first intermediate plate. For example, the second intermediate plate is made of the same material, for example, metal or plastic, as the first intermediate plate. As a result, costs are reduced. For example, the second intermediate plate is an intermediate sheet, in particular an intermediate sheet including screen printing. The second intermediate plate is, for example, configured for establishing a seal between the first valve housing and the second valve housing. For example, the second intermediate plate is arranged directly between the first valve housing and the second valve housing, i.e., without a further element between the first valve housing and the second valve housing. Alternatively, a further element is arranged next to the second intermediate plate, between the second valve housing and the first valve housing.

The second intermediate plate is, for example, a stamped part. The second intermediate plate is, for example, manufactured without using a casting process. As a result, costs are reduced. The second intermediate plate does, for example, not have a valve. For example, the second intermediate plate does not have a pattern of the ducts. As a result, a favorable installation space situation is achieved. For example, at least one of the first intermediate plate or the second intermediate plate has at least one orifice. For example, a seal is implemented between the second valve housing and the first valve housing with the aid of the second intermediate plate, in particular using a small amount of material and at low cost. The second intermediate plate has, for example, passages, in order to hydraulically connect the first valve housing to the second valve housing.

The second intermediate plate is thinner than 5 mm, in particular thinner than 2 mm, in particular thinner than 1.4 mm. For example, the second intermediate plate is 1.3 mm thick. For example, the second intermediate plate is between 1.8 mm and 0.8 mm thick.

For example, the first intermediate plate forms an interface between the housing top section and the first valve housing. The second intermediate plate forms an interface between the second valve housing and the first valve housing. For example, at least one of the first intermediate plate or the second intermediate plate has an orifice. For example, at least one of the first intermediate plate the second intermediate plate has or is a paper seal. As a result, a modular configuration of the hydraulic control unit is achieved. This simplifies a method for manufacture.

At least one of the housing top section, the first valve housing, or the second valve housing is made, for example, essentially of a metal, for example, with a casting process. For example, at least one of the first valve housing, the second valve housing, or the housing top section is made principally from an aluminum die cast material. Alternatively, at least one of the housing top part, the first valve housing, or the second valve housing is made principally of a plastic. As a result, for example, the first intermediate plate and/or the second intermediate plate for sealing is omittable. This reduces costs.

The housing top section includes, for example, a first planar surface. For example, the housing top section includes two first planar surfaces, in particular, two opposed planar surfaces. The two first planar surfaces are aligned, for example, in parallel to one another. The first planar surface is, for example, configured for forming a support surface for the transmission housing. A second first planar surface is, for example, designed for forming a support surface for the first valve housing and/or for the first intermediate plate. As a result, a sealing function is achieved.

The first valve housing include a second planar surface. The second planar surface is, for example, parallel to the first planar surface. For example, the first valve housing includes two second planar surfaces. For example, a second planar surface is a support surface for the housing top section or for the first intermediate plate. A second planar surface of the first valve housing forms a support surface for the second intermediate plate and/or the second valve housing.

The second valve housing include, for example, a third planar surface. The third planar surface is, for example, parallel to the first planar surface and/or to the second planar surface. The third planar surface, for example, is a support surface for the second intermediate plate and/or for the first valve housing.

At least one of the first planar surface, the second planar surface, or the third planar surface forms support surfaces and/or performs a sealing function.

The hydraulic control unit includes, for example, at least three layers of cast components. For example, the hydraulic control unit has a first layer including the housing top section as a cast component, a second layer including the first valve housing as a cast component, and a third layer including the second valve housing as a cast component. For example, the hydraulic control unit has precisely three layers of cast components. As a result, costs are saved and the hydraulic control unit has, as a result, two available levels for channel routing.

The hydraulic control unit has a layered design. For example, the hydraulic control unit is a layer model. As a result, an installation space advantage is achieved. For example, as a result, greater adjustment dynamics is achieved in combination with a weight reduction. For example, as a result, a method for manufacturing the hydraulic control unit and a method for exchanging replacement parts are simplified.

The housing top section is a duct plate or a valve plate. The housing top section has one or multiple hydraulic supply duct(s) and/or hydraulic flow duct(s). The valve plate includes, for example, one or multiple valve(s). The duct plate is, for example, valve-less. The duct plate has, for example, one or multiple high pressure duct(s) and/or one or multiple low pressure duct(s). The duct plate is made, for example, of plastic. For example, the duct plate includes multiple plastic layers. Alternatively, the duct plate and/or the valve plate is an aluminum pressure die casting. For example, the duct plate and/or the valve plate is made principally of plastic. As a result, for example, the first intermediate plate is omittable. Optionally, the housing top section includes one or multiple sheet-metal component(s), in particular for reinforcement. For example, the duct plate includes distribution ducts to hydraulic consumers of the transmission. For example, a feed of a pilot pressure takes place via the duct plate. For example, the valve plate includes valve spools, in particular guided valve spools. For example, the housing top section is arranged or arrangeable within a transmission housing and/or a clutch bell housing. The housing top section does, for example, not have a pressure regulator.

At least one of the first valve housing or the second valve housing is thicker than at least one of the housing top section, the first intermediate plate, or the second intermediate plate. The housing top section is, for example, between 0.5 cm and 2 cm, in particular between 0.7 cm and 1.5 cm, in particular between 0.9 cm and 1.2 cm thick. The first valve housing and/or the second valve housing is, for example, between 0.8 cm and 3 cm, in particular between 1 cm and 1.5 cm, in particular between 1 cm and 1.2 cm thick. The thickness in this case is measured perpendicularly to at least one of the first planar surface, the second planar surface, or the third planar surface.

For example, the first valve housing is thicker than the second valve housing. For example, the second valve housing only has one planar surface, in particular a planar surface that faces the second intermediate plate and/or the first valve housing.

The first valve housing is configured for providing a basic function. The second valve housing is configured for providing a supplement to the basic function. For example, the first valve housing has a basic control unit function. For example, a basic circuit diagram or first control circuit is implemented in the first valve housing. The supplement to the basic function includes, for example, a function in addition to the basic function, for example, an emergency operation, in particular an emergency operation of the sixth gear. The second valve housing has, for example, one or multiple valve(s) for supplementing the basic function and forming a supplemental or second control circuit. As a result, a supplement to the basic function is obtained without increasing a volume of the first valve housing. As a result, for example, a modular configuration is achieved. The first valve housing forms or has, for example, a first module. The second valve housing forms or has, for example, a second module. As a result, an efficient adaptation is achieved for different applications of a hydraulic control unit, for example, for different types of transmissions.

The first valve housing is arranged, for example, between the housing top section and the second valve housing. The hydraulic control unit has, at least some of the following sequence of elements: The housing top section, the first intermediate plate, the first valve housing, the second intermediate plate, the second valve housing. For example, at least one of the first intermediate plate or the second intermediate plate is omittable, for example, in an embodiment where at least one of the housing top section, the first valve housing, or the second valve housing is made of plastic.

The first valve housing has one or multiple device(s) for connection to the second valve housing. For example, the first valve housing has one or multiple device(s) for the electrical and/or hydraulic and/or mechanical connection to the second valve housing. Alternatively, or additionally, at least one of the housing top section or the second valve housing has one or multiple device(s) for connection to the first valve housing. Alternatively, or additionally, the first valve housing has one or multiple device(s) for connection to the housing top section. The devices are selected from the group including a duct for the hydraulic connection, structures for insert parts, a spherical piece, a change-over ball, a receptacle for a change-over ball, a locating pin, a receptacle for a locating pin, an electrical connection, and a recess on a planar surface.

A duct for the hydraulic connection connects, for example, the first valve housing to the second valve housing. For example, at least one of the first valve housing or the second valve housing has at least one receptacle for a change-over ball, preferably two receptacles for two change-over balls. At least one of the first valve housing or the second valve housing has a locating pin, for example, two locating pins, and/or a receptacle for a locating pin, for example, two receptacles for locating pins. The change-over ball controls a hydraulic flow. The change-over ball forms, for example, an OR component for a hydraulic flow. The locating pin(s) is arranged, for example, on a planar surface of the first valve housing, which faces the second valve housing. The locating pin(s) is configured, for example, for aligning parts of the hydraulic control unit with respect to one another during assembly, in particular for preventing an offset during a through-flow. The recess forms, for example, a flow passage. As a result, hydraulic connections and/or a mechanical fit are established between the housing top section and/or the first valve housing and/or the second valve housing.

For example, the second valve housing has, at least partially, a parking lock valve and/or a position valve and/or a solenoid valve for a parking lock and/or a pressure regulator for an emergency operation and/or one, preferably two, change-over balls.

The hydraulic control unit has, for example, a bolt. For example, the hydraulic control unit has multiple bolts. For example, the hydraulic control unit has one or multiple bore hole(s) for bolts. For example, at least one of the housing top section, the first valve housing, the second valve housing, the first intermediate plate, or the second intermediate plate includes one or multiple bore hole(s) or passage(s) for bolts. For example, the hydraulic control unit has at least one, for example, three M5 bolts, and/or at least one, for example, at least five, in particular nine M6 bolts. On the second valve housing, for example, two fixing plates are arranged, each with the aid of at least one M5×12 bolt.

The bolt is configured for fixing two or more elements relative to one another, wherein the elements are selected from a group of elements including the housing top section, the first valve housing, the second valve housing, the duct plate, the valve plate, the first intermediate plate, the second intermediate plate, the first valve, the second valve, a pressure regulator, an individual plug, a transmission housing, and a cable or wire harness. For example, the bolt is an internal bolt. One or more of the bolts are utilized, for example, for attaching the duct plate or the valve plate to at least one of the first intermediate plate, to the second intermediate plate, the first valve housing, or to the second valve housing and/or for sealing off sealing surfaces. For example, a bolt fixes the housing top section relative to the first valve housing as well as for also fixing the second valve housing relative to the housing top section and the first valve housing. As a result, the same bolt positions are used, for example, for three layers of castings. This increases an efficiency of the manufacture of the hydraulic control unit.

The bolt is, for example, a through bolt for attaching the hydraulic control unit to a transmission housing. The bolt is, for example, a through bolt for attaching the hydraulic control unit to a transmission housing. For example, the through bolt has a sealing function, for example, by way of pressing together, in particular in addition to a fixing function. For example, the hydraulic control unit has multiple through bolts. At least a portion of the through bolts is utilized for sealing off sealing surfaces, in addition to being utilized for attaching the hydraulic control unit to the transmission. As a result, the number of bolts, bore holes, and seals is reduced, for example, to reduce cost and simplify manufacturing of the hydraulic control unit.

The second valve housing has, for example, passages for the bolts. The second valve housing has, for example, two to twenty passages for bolts, for example, twelve passages. The passages for bolts in the second valve housing are aligned, for example, perpendicularly to the third planar surface. The second valve housing has, for example, a position valve and/or a solenoid valve, for example, a solenoid valve for a parking lock and/or a pressure regulator, for example, a pressure regulator for an emergency operation, and/or a parking lock valve.

The first valve housing for example, at least partially accommodates two to ten pressure regulators, in particular five to seven pressure regulators, for example, six pressure regulators. The hydraulic control unit has, for example, two to twenty pressure regulators, in particular four to fifteen pressure regulators, in particular five to seven pressure regulators. The pressure regulator is, for example, an electric pressure regulator (EPR). The pressure regulator controls, by a closed-loop system, a hydraulic pressure between 0 bar and 5 bar. At least one of the first valve or the second valve increases a pressure by a factor of 2 to 6, in particular by a factor of 3 to 4.

The hydraulic control unit has, for example, a first individual plug for the electrical connection to a wire harness. In addition, the hydraulic control unit has a second individual plug for the hydraulic connection to the wire harness. For example, an alignment of the first individual plug has a second angle with respect to an alignment of the second individual plug. The alignment of the first individual plug and/or the alignment of the second individual plug are, for example, directions for connecting an individual plug to the wire harness. The second angle is, for example, between 5° and 355°, in particular 20° and 100°, in particular 30° and 50°, in particular 35° and 45°, in particular 39° and 41°, for example, 40°. This is advantageous with regard to installation space-related problems. For example, the first individual plug is configured for connecting a second valve to the wire harness in each case, in particular a second valve arranged at least partially in the second valve housing in each case. At least one of the first individual plug or the second individual plug is fixed on the second valve housing, for example, with the aid of a fixing plate in each case. For example, two fixing plates are arranged on the second valve housing, in particular two separate fixing plates, for example, for actuators, for example, for a pressure regulator and for a solenoid valve.

In a further aspect of the present invention, a transmission is provided. The transmission has a hydraulic control unit as described above. The transmission is, for example, a multi-ratio automatic transmission, in particular a transmission having a starting component, for example, having an integrated electric pump (IEP) or a transmission having an integrated starting component (ISC). The transmission is, for example, a converter transmission. The transmission has, for example, between five and ten gears, in particular between seven and nine gears, for example, eight gears.

For example, a planar extension of the second valve housing is less than a planar extension of the first valve housing, for example, by at least 10%, for example, at least 30%, in particular at least 50% smaller relative to a planar surface of the first valve housing. In a bottom view of the hydraulic control unit, for example, both the first valve housing as well as the second valve housing are visible. For example, in a bottom view of the hydraulic control unit, at least 10% of the bottom view of the first valve housing, for example, at least 30%, in particular at least 50% of the bottom view of the first valve housing is visible.

The transmission has, for example, an oil pan for forming an oil sump. The oil pan is arranged, for example, on an underside of the transmission, in particular on an underside of the transmission housing, in particular in the direction of a gravitational force usually acting on the transmission. The second valve housing is arranged, for example, between the first valve housing and the oil pan in the oil sump. For example, oil of the oil sump flows around the second valve housing, in particular during a typical application of the transmission. The second valve housing and/or the first valve housing have, for example, a suction port for scavenging oil from the oil sump. For example, each of the first valve housing and/or the second valve housing is arranged in the oil pan and/or in the oil sump. As a result, an intake of air is prevented. For example, at least one pump for scavenging hydraulic fluid out of the oil sump is arranged in the first valve housing and/or in the second valve housing. The pump is drivable, for example, by an internal combustion engine and/or by an electric machine.

The transmission has, for example, a wire harness. The wire harness is, for example, a device for bundling electrical terminals of multiple elements of the transmission. For example, the second valve housing has an actuator. The actuator is connectable to the wire harness by one or multiple individual plug(s). For example, each of the first valve and/or the second valve is connectable to the wire harness with the aid of one or multiple individual plug(s). For example, an alignment of the individual plugs can be different. As a result, for example, collisions with the oil pan are avoided and/or installation space-related problems are improved.

In a further aspect of the present invention, a method for manufacturing a hydraulic control unit is provided. The method is a method for manufacturing a hydraulic control unit as described above. The method includes:
  providing a first hydraulic control unit module having the housing top section and the first valve housing including the first valve;
  providing the second valve housing including the second valve; and
  mounting the second valve housing on the first hydraulic control unit module.

For example, the first two steps are interchangeable with respect to time. For example, the method includes one or more further step(s), for example, before, after, or between the aforementioned steps. The modular configuration of the hydraulic control unit simplifies the manufacturing method. In particular, in one embodiment, the first hydraulic control unit module is preassembled.

In the method for manufacturing the hydraulic control unit, for example, each of the first valve housing and/or the second valve housing is bolted to at least one of the first intermediate plate, the second intermediate plate, or the housing top section, for example, to the duct plate or the valve plate, for example, by bolts, in particular by two bolts.

For example, initially, the first valve housing is bolted to the first intermediate plate and the housing top section and eventually also to the second intermediate plate. Alternatively, the first valve housing is initially bolted to the housing top section. Thereafter, the second valve housing is bolted to the first hydraulic control unit module. The first hydraulic control unit module has, for example, the housing top section and the first valve housing. In addition, the first hydraulic control unit module also has the first intermediate plate and/or the second intermediate plate. For example, three further bolts, for example, three further internal bolts, are utilized for bolting the second valve housing to the first hydraulic control unit module. For example, the first hydraulic control unit module is a preassembled assembly. For example, the hydraulic control unit is completed in a workpiece holder. As a result, an assembly of the hydraulic control unit is simplified.

It is understood that the features, which are mentioned above and which will be described in greater detail the following, are usable not only in the particular combination indicated, but also in other combinations or alone, without departing from the scope of the present invention.

BRIEF DESCRIPTION OF THE DRAWINGS

Exemplary embodiments of the invention are represented in the drawing and are explained in greater detail in the following description. Wherein.

DETAILED DESCRIPTION

Figure 1A:
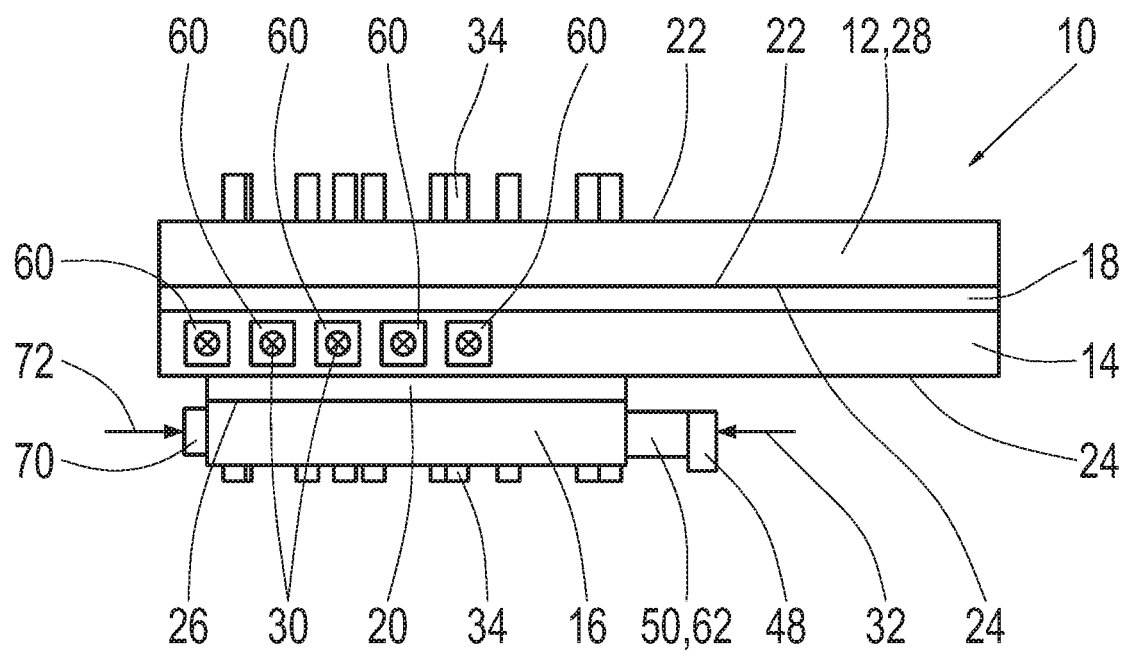
FIG. 1A shows a diagrammatic side view of a first exemplary embodiment of the novel control unit.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1A, 1B, and 2-6 show exemplary embodiments of a novel hydraulic control unit 10.

The hydraulic control unit 10 for a transmission 36 has a housing top section 12, a first valve housing 14, and a second valve housing 16. A first valve 60 is arranged in the first valve housing 14. A second valve 62 is arranged in the second valve housing 16. The first valve 60 is aligned along a first direction 30. The second valve 62 is aligned along a second direction 32. The first direction 30 is not identical to or is different from the second direction 32.

In the hydraulic control units 10 represented in FIGS. 1A, 1B, and 2-6, multiple first valves 60, for example, five first valves 60, are arranged in the first valve housing 14. The first valves 60 are arranged in parallel to one another in the first direction 30. Two second valves 62 are arranged in the second valve housing 16. The first direction 30 has a first angle 58 with respect to the second direction 32, the first angle 58 is equal to 90°.

Figure 1B:
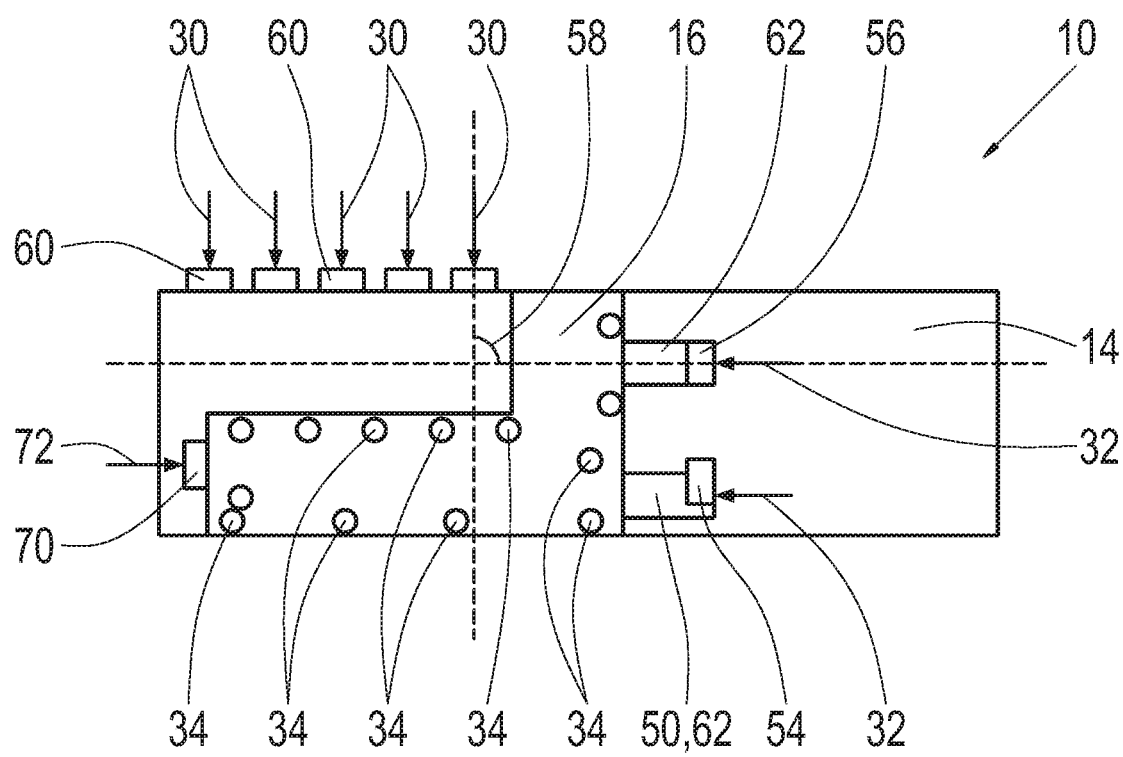
FIG. 1B shows a diagrammatic bottom view of the first exemplary embodiment of the novel hydraulic control unit.

The hydraulic control unit 10 represented in FIGS. 1A and 1B has a third valve 70 in the second valve housing 16. The third valve 70 is aligned along a third direction 72. The third direction 72 likewise makes an angle of 90° with respect to the first direction 30. The third direction 72 makes an angle of 180° with respect to the second direction 32. As such, the third valve 70 is arranged antiparallel, or parallel and extending in an opposite direction, to the two second valves 62.

The exemplary embodiment of the hydraulic control unit 10 represented in FIGS. 1A and 1B has a first intermediate plate 18 between the housing top section 12 and the first valve housing 14. The first intermediate plate 18 is thinner than 5 mm, in particular thinner than 2 mm, in particular thinner than 1.4 mm.

The exemplary embodiment of the hydraulic control unit 10 represented in FIGS. 1A and 1B also has a second intermediate plate 20 between the first valve housing 14 and the second valve housing 16. The second intermediate plate 20 is thinner than 5 mm, in particular thinner than 2 mm, in particular thinner than 1.4 mm.

Figure 2:
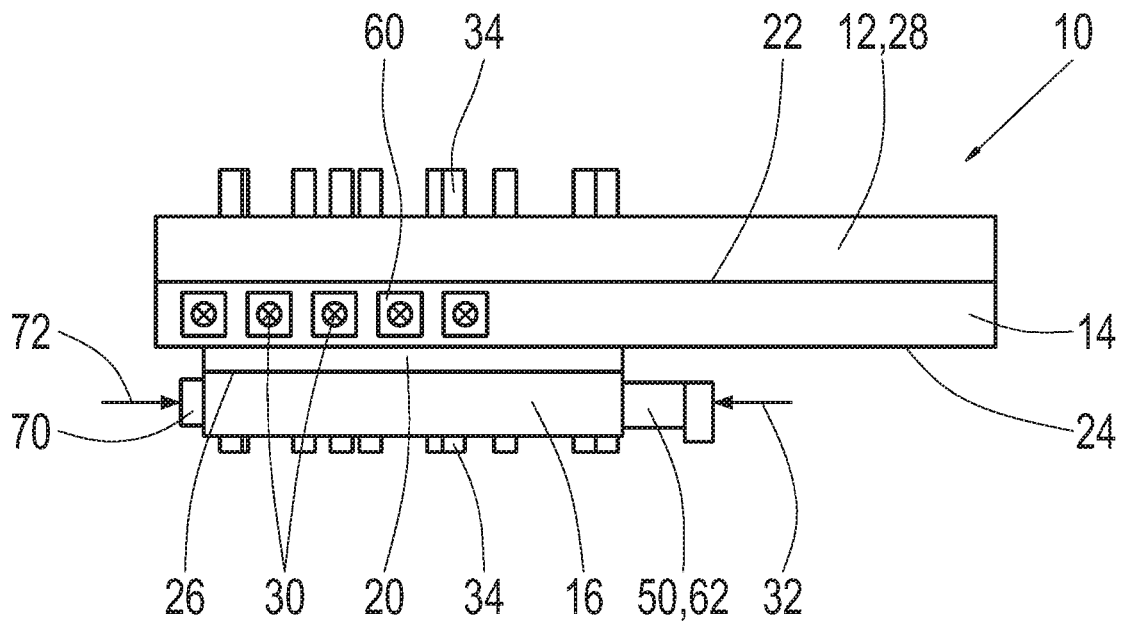
FIG. 2 shows a diagrammatic side view of a second exemplary embodiment of the novel hydraulic control unit.

The exemplary embodiment of the hydraulic control unit 10 represented in FIG. 2 has only one intermediate plate, the second intermediate plate 20 between the first valve housing 14 and the second valve housing 16, and no first intermediate plate between the housing top section 12 and the first valve housing 14.

Figure 3:
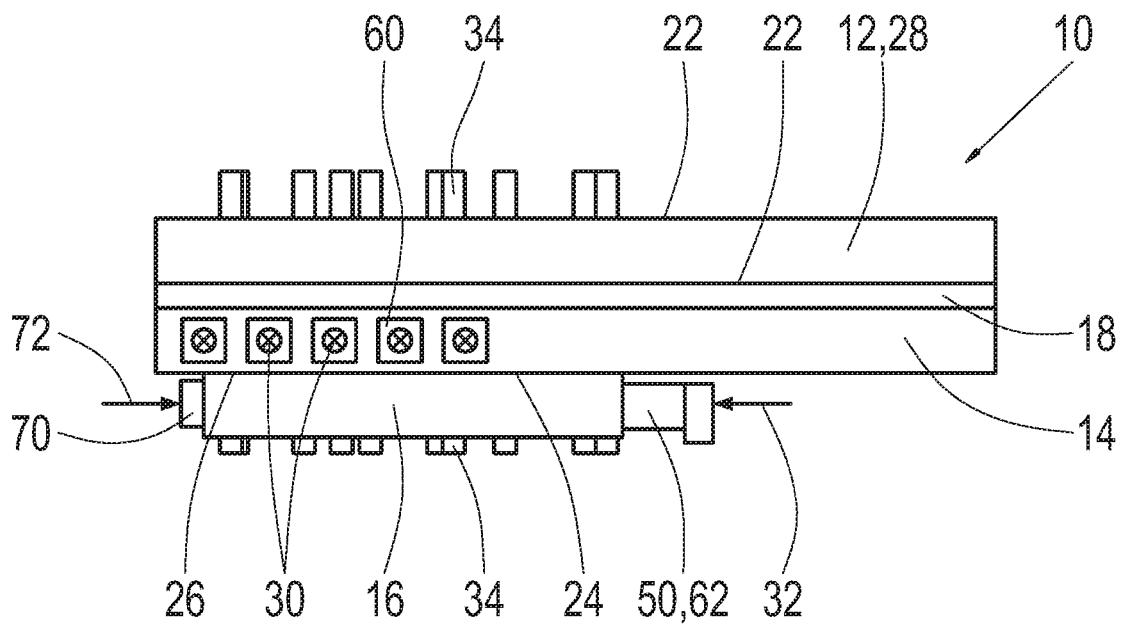
FIG. 3 shows a diagrammatic side view of a third exemplary embodiment of the novel hydraulic control unit.

In contrast thereto, the exemplary embodiment of the hydraulic control unit 10 according to FIG. 3 has only one intermediate plate, the first intermediate plate 18 between the housing top section 12 and the first valve housing 14, and no second intermediate plate. The exemplary embodiment of a hydraulic control unit 10 represented in FIG. 4 has neither a first intermediate plate nor a second intermediate plate between the first valve housing 14 and the second valve housing 16.

In the figures, the thicknesses of the first intermediate plate 18 and of the second intermediate plate 20 are represented thinner as compared to the first valve housing 14 and to the second valve housing 16, for illustration purposes.

In the represented exemplary embodiments of the novel hydraulic control unit 10, the housing top section 12 has two first planar surfaces 22. The first valve housing 14 has two second planar surfaces 24. The second valve housing 16 has a third planar surface 26. The first planar surface 22 and the second planar surface 24 and the third planar surface 26 are arranged in parallel to one another.

In the exemplary embodiments of the novel hydraulic control unit 10 represented in the figures, the housing top section 12 is a duct plate 28. The first valve housing 14 is configured for providing a basic function. The second valve housing 16 is configured for providing a supplement to the basic function.

In the exemplary embodiments represented, the first valve housing 14 is arranged between the housing top section 12 and the second valve housing 16.

Figure 4:
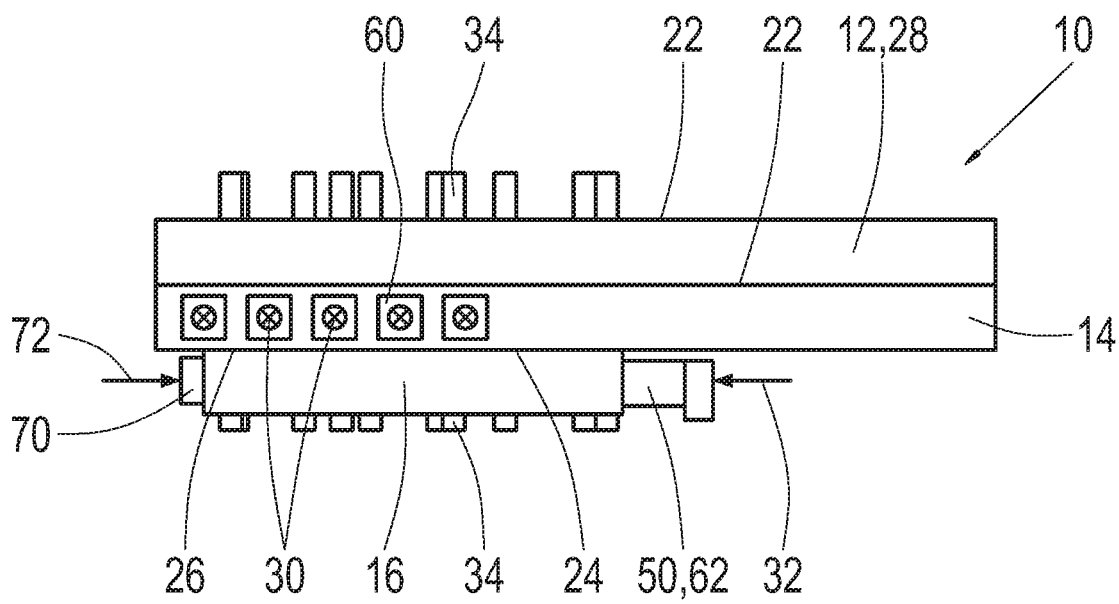
FIG. 4 shows a diagrammatic side view of a fourth exemplary embodiment of the novel hydraulic control unit.

The first valve housing 14 has, for example, a second planar surface 24, as represented in FIG. 4. The first valve housing 14 has one or multiple device(s) for connection to the second valve housing 16. The devices are selected from the group including a duct for the hydraulic connection 44, structures for insert parts, a spherical piece, a change-over ball, a receptacle for a change-over ball 42, a locating pin, a receptacle for a locating pin 40, an electrical connection, and a recess on a planar surface 26.

Figure 5:
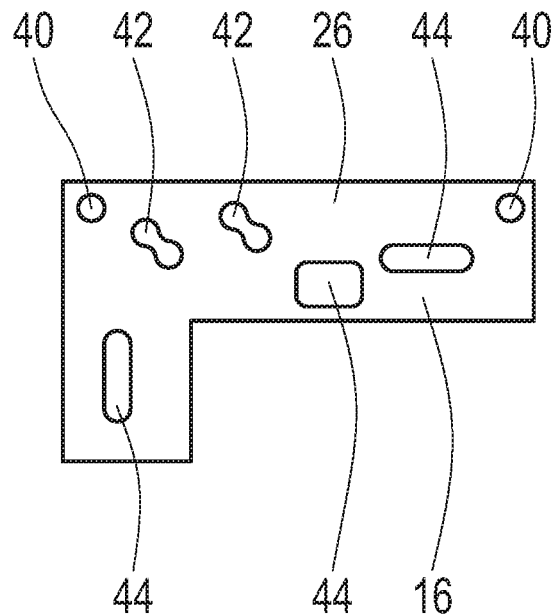
FIG. 5 shows a schematic of a third planar surface of an exemplary embodiment of the novel hydraulic control unit.

The first valve housing 14 represented in FIG. 5 has two change-over ball receptacles 42 and two locating pins 40, as well as multiple hydraulic connections 44.

Each of the hydraulic control units 10 represented in the figures has at least one bolt 34. The hydraulic control unit 10 has, in particular, multiple bolts 34. The bolts 34 are arranged perpendicularly to the first planar surface 22 and/or to the second planar surface 24 and/or to the third planar surface 26. The bolts 34 fix two or more elements relative to one another. The elements are selected from a group of elements including the housing top section 12, the first valve housing 14, the second valve housing 16, a duct plate 28, a valve plate, a first intermediate plate 18, a second intermediate plate 20, a first valve 60, a second valve 62, a pressure regulator 50, an individual plug 48, a transmission housing 46, and a wire harness. The bolts 34 are through bolts for attaching the hydraulic control unit 10 to a transmission housing 46. The through bolts also have, at least partially, a sealing function.

Figure 6:
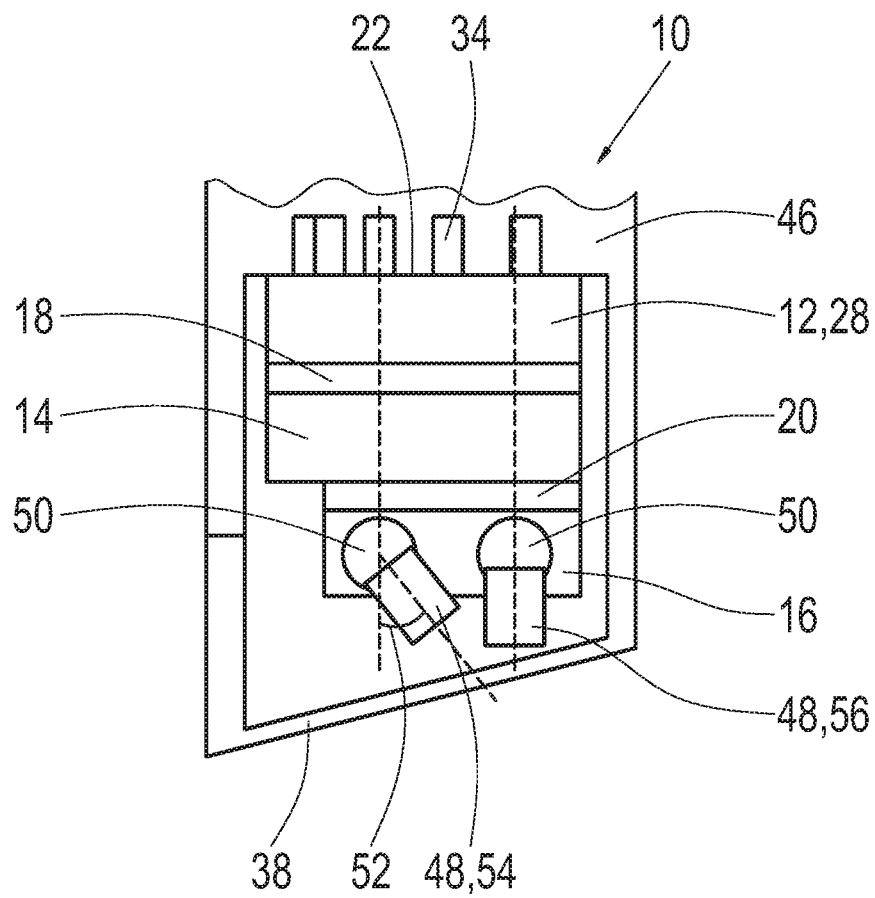
FIG. 6 shows a cross-section of a part of a transmission housing including a diagrammatic view of an exemplary embodiment of the novel hydraulic control unit.

Each of the hydraulic control units 10 represented in the figures has a first individual plug 54 for the electrical connection to a wire harness and a second individual plug 56 for the electrical connection to the wire harness. An alignment of the first individual plug 54 has a second angle 52 with respect to an alignment of the second individual plug 56, as represented, in particular, in FIG. 6. The second angle 52 is, for example, between 20° and 60°, for example, between 35° and 45°, in particular 40°, as represented in FIG. 6.

Figure 7:
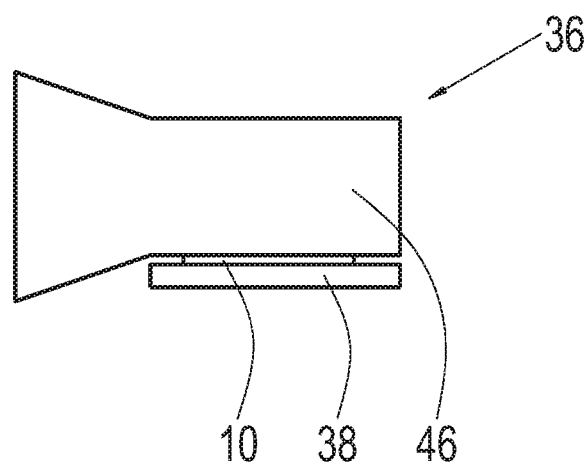
FIG. 7 shows an exemplary embodiment of the novel transmission.

FIG. 7 shows an exemplary embodiment of a transmission 36 having a hydraulic control unit 10 as described above. As shown in FIGS. 6 and 7, the transmission 36 has an oil pan 38 for forming an oil sump. As particularly shown in FIG. 6, the second valve housing 16 is arranged between the first valve housing 14 and the oil pan 38 in the oil sump. The transmission 36 has a wire harness. The second valve housing 16 has an actuator, wherein the actuator is connected to the wire harness by one or multiple individual plug(s) 48, in particular by the first individual plug 54 and the second individual plug 56. The transmission includes a transmission housing 46.

Figure 8:
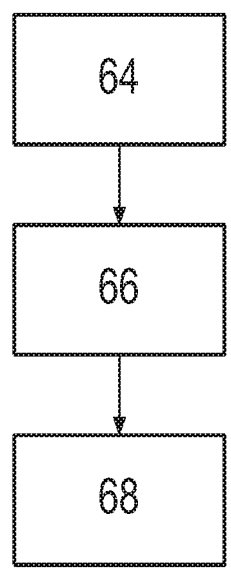
FIG. 8 shows a representation of an exemplary embodiment of the novel method for manufacturing the novel hydraulic control unit.

FIG. 8 shows an exemplary embodiment of the method for manufacturing a hydraulic control unit 10 as described above. In a first step 64, a first hydraulic control unit module having the housing top section 12 and the first valve housing 14 including the first valve 60 is made available. In a second step 66, the second valve housing 16 including the second valve 62 is made available. In a third step 68, the second valve housing 16 is mounted on the first hydraulic control unit module. For example, the method includes further steps, which are not represented in the figures.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 10 hydraulic control unit
12 housing top section
14 first valve housing
16 second valve housing
18 first intermediate plate
20 second intermediate plate
22 first planar surface
24 second planar surface
26 third planar surface
28 duct plate
30 first direction
32 second direction
34 bolt
36 transmission
38 oil pan
40 receptacle for a locating pin
42 receptacle for a change-over ball
44 duct for the hydraulic connection
46 transmission housing
48 individual plug
50 pressure regulator
52 second angle
54 first individual plug
56 second individual plug
58 first angle
60 first valve
62 second valve
64 first step
66 second step
68 third step
70 third valve

The invention claimed is:

1. A hydraulic control unit (10) for a transmission (36) of a motor vehicle drive train, comprising:
    a housing top section (12);
    a first valve housing (14) comprising a plurality of first valves (60), each of the plurality of first valves (60) being aligned along a first direction (30);
    a second valve housing (16) comprising a plurality of second valves (62), each of the plurality of second valves (62) being aligned along a second direction (32), the first direction (30) differing from the second direction (32);
    a first individual plug (54) for an electrical connection to a harness; and
    a second individual plug (56) for an electrical connection to the harness,
    wherein the first individual plug (54) and the second individual plug (56) are connectable to an element of the second valve housing (16), the first individual plug (54) and the second individual plug (56) being coplanar to one another and the first individual plug (54) being at a second angle (52) with respect to the second individual plug (56) when the first individual plug (54) and the second individual plug (56) are connected to the element of the second valve housing (16), the second angle (52) being acute.

2. The hydraulic control unit of claim 1, wherein the first direction (30) has a first angle (58) with respect to the second direction (32), the first angle (58) being within a range of 5° to 355°.

3. The hydraulic control unit of claim 2, wherein the first angle (58) is within a range of 80° to 100°.

4. The hydraulic control unit of claim 3, wherein the first angle (58) is within a range of 88° to 92°.

5. The hydraulic control unit of claim 1, further comprising a first intermediate plate (18) between the housing top section (12) and the first valve housing (14),
wherein a thickness of the first intermediate plate (18) is less than 5 mm.

6. The hydraulic control unit of claim 5, wherein the thickness of the first intermediate plate (18) is less than 2 mm.

7. The hydraulic control unit of claim 6, wherein the thickness of the first intermediate plate (18) is less than 1.4 mm.

8. The hydraulic control unit of claim 5, further comprising a second intermediate plate (20) between the first valve housing (14) and the second valve housing (16),
wherein a thickness of the second intermediate plate (20) is less than 5 mm.

9. The hydraulic control unit of claim 8, wherein the thickness of the second intermediate plate (20) is less than 2 mm.

10. The hydraulic control unit of claim 1, wherein the housing top section (12) comprises a first planar surface (22),
wherein the first valve housing (14) comprises a second planar surface (24),
wherein the second valve housing (16) comprises a third planar surface (26),
wherein the first planar surface (22), the second planar surface (24), and the third planar surface (26) are parallel to one another.

11. The hydraulic control unit of claim 1, wherein the housing top section (12) is a duct plate (28) or a valve plate.

12. The hydraulic control unit of claim 1, wherein the first valve housing (14) forms at least a portion of a first control circuit, and wherein the second valve housing (16) forms at least a portion of a second control circuit.

13. The hydraulic control unit of claim 1, wherein the first valve housing (14) is between the housing top section (12) and the second valve housing (16).

14. The hydraulic control unit of claim 1, wherein the first valve housing (14) comprises at least one device connectable to the second valve housing (16), wherein the at least one device comprises a duct for a hydraulic connection (44), structures for insert parts, a spherical piece, a change-over ball, a receptacle for a change-over ball (42), a locating pin, a receptacle for a locating pin (40), an electrical connection, or a recess on a planar surface (26).

15. The hydraulic control unit of claim 1, further comprising a bolt (34), wherein the bolt (34) fixes at least two elements relative to one another, wherein the at least two elements comprises two or more of the housing top section (12), the first valve housing (14), the second valve housing (16), a duct plate (28), a valve plate, a first intermediate plate (18), a second intermediate plate (20), one or more of the plurality of first valves (60), one or more of the plurality of second valves (62), a pressure regulator (50), an individual plug (48), a transmission housing (46), and a cable harness.

16. A transmission, comprising:
a hydraulic control unit (10), the hydraulic control unit (10) comprising:
a housing top section (12);
a first valve housing (14) comprising a plurality of first valves (60), each of the plurality of first valves (60) being aligned along a first direction (30); and
a second valve housing (16) comprising a plurality of second valves (62), each of the plurality of second valves (62) being aligned along a second direction (32), the first direction (30) differing from the second direction (32); and
an oil pan (38) for forming an oil sump,
wherein the second valve housing (16) is between the first valve housing (14) and the oil pan (38).

17. The transmission of claim 16, further comprising a harness, wherein the second valve housing (16) comprises an actuator, wherein the actuator is connectable to the harness by at least one plug (48).

18. A method for manufacturing a hydraulic control unit (10), the method comprising:
providing a first hydraulic control unit module comprising a housing top section (12) and a first valve housing (14), the first valve housing (14) comprising a plurality of first valves (60), each of the plurality of first valves (60) being aligned along a first direction (30);
providing a second valve housing (16), the second valve housing (16) comprising a plurality of second valves (62), each of the plurality of second valves (62) being aligned along a second direction (32);
mounting the second valve housing (16) on the first hydraulic control unit module, the first direction (30) differing from the second direction (32) when the second valve housing (16) is mounted on the first hydraulic control unit module;
providing a first individual plug (54) for an electrical connection to a harness; and
providing a second individual plug (56) for an electrical connection to the harness,
wherein the first individual plug (54) and the second individual plug (56) are connectable to an element of the second valve housing (16), the first individual plug (54) and the second individual plug (56) being coplanar to one another and the first individual plug (54) being at a second angle (52) with respect to the second individual plug (56) when the first individual plug (54) and the second individual plug (56) are connected to the element of the second valve housing (16), the second angle (52) being acute.

* * * * *